United States Patent [19]
Gruen et al.

[11] 4,262,739
[45] Apr. 21, 1981

[54] SYSTEM FOR THERMAL ENERGY STORAGE, SPACE HEATING AND COOLING AND POWER CONVERSION

[75] Inventors: Dieter M. Gruen, Downers Grove; Paul R. Fields, Chicago, both of Ill.

[73] Assignee: The United States of America as represented by the Department of Energy, Washington, D.C.

[21] Appl. No.: 741

[22] Filed: Jan. 3, 1979

Related U.S. Application Data

[63] Continuation of Ser. No. 773,363, Mar. 1, 1977, abandoned.

[51] Int. Cl.³ .............................................. F28D 15/00
[52] U.S. Cl. .......................................... 165/485; 62/2; 62/4; 126/263; 165/DIG. 17
[58] Field of Search .................... 165/DIG. 17, 107, 1, 165/48 S; 62/2, 4; 126/263

[56] References Cited
U.S. PATENT DOCUMENTS

| | | | |
|---|---|---|---|
| 3,075,361 | 1/1963 | Lindberg, Jr. | 62/4 |
| 3,922,872 | 12/1975 | Reilly et al. | 423/248 X |
| 3,943,719 | 3/1976 | Terry et al. | 60/644 |
| 3,972,183 | 8/1976 | Chubb | 60/641 |
| 4,040,410 | 8/1977 | Libowitz | 126/270 |
| 4,044,819 | 8/1977 | Cottingham | 165/1 |
| 4,055,962 | 11/1977 | Terry | 62/102 X |

Primary Examiner—Leland A. Sebastian
Attorney, Agent, or Firm—James W. Weinberger; Frank H. Jackson; Richard G. Besha

[57] ABSTRACT

An integrated system for storing thermal energy, for space heating and cooling and for power conversion is described which utilizes the reversible thermal decomposition characteristics of two hydrides having different decomposition pressures at the same temperature for energy storage and space conditioning and the expansion of high-pressure hydrogen for power conversion. The system consists of a plurality of reaction vessels, at least one containing each of the different hydrides, three loops of circulating heat transfer fluid which can be selectively coupled to the vessels for supplying the heat of decomposition from any appropriate source of thermal energy from the outside ambient environment or from the spaces to be cooled and for removing the heat of reaction to the outside ambient environment or to the spaces to be heated, and a hydrogen loop for directing the flow of hydrogen gas between the vessels. When used for power conversion, at least two vessels contain the same hydride and the hydrogen loop contains an expansion engine. The system is particularly suitable for the utilization of thermal energy supplied by solar collectors and concentrators, but may be used with any source of heat, including a source of low-grade heat.

7 Claims, 1 Drawing Figure

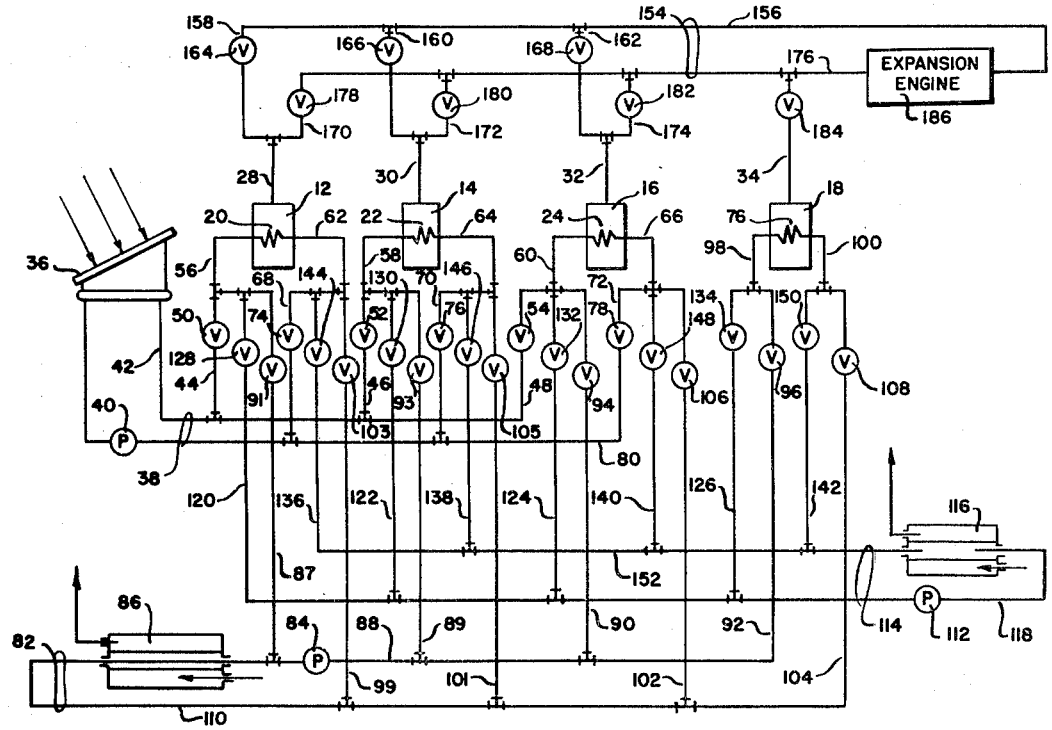

SYSTEM FOR THERMAL ENERGY STORAGE, SPACE HEATING AND COOLING AND POWER CONVERSION

CONTRACTUAL ORIGIN OF THE INVENTION

The invention described herein was made in the course of, or under, a contract with the UNITED STATES ENERGY RESEARCH AND DEVELOPMENT ADMINISTRATION.

This is a continuation of application Ser. No. 773,363, filed Mar. 1, 1977 now abandoned.

BACKGROUND OF THE INVENTION

This invention relates to a system for storing and utilizing thermal energy. More specifically, this invention relates to an integrated system for storing thermal energy, particularly low-grade thermal energy, and utilizing the thermal energy for space heating and cooling and for power generation.

Soaring demands for fossil energy coupled with dwindling supplies have stimulated a search for alternative, particularly renewable, sources of energy. It is well recognized that second law energy utilization efficiencies are very low (less than about 10%) for fissile or fossil fuels used directly or in the form of electricity in normal space heating and cooling applications. Since about 25% of the total energy consumption in the United States is for these purposes, an incentive exists for the utilization of lower grade heat sources better matched thermodynamically for space heating and cooling, since second law efficiencies would be much higher.

A number of sources of low-grade heat, i.e. temperatures up to about 150° C., such as reject heat from central power stations, either fossil or nuclear fueled, geothermal energy and particularly solar energy, are in principle very well adapted to these applications. However, the successful use of energy from any of these sources, particularly for space heating and cooling, involves the storage of thermal energy. The intermittent availability of solar radiation in particular requires the storage of energy for use at times when solar radiation is not available. Traditional methods for storage of heat depend on heat capacity or phase change effects. Although water possesses a high specific heat, it has a low volumetric energy storage capacity and requires insulated holding tanks. Pebble beds are inexpensive but have the same drawbacks as water with a much lower heat capacity. Salt hydration-dehydration equilibria have a tendency toward supersaturation after many cycles, and stratification interferes with reversibility.

The use of hydrogen which can react exothermally with some intermetallic compounds to form decomposable hydrides has been suggested as a form of thermal energy storage. One such method and apparatus for storing thermal energy and for recovering the stored energy for space heating using metal hydrides is described in U.S. patent application Ser. No. 605,960, filed Aug. 19, 1975 and now abandoned.

Equally important with the ability to provide space heating in many parts of the country if the ability to also cool these same spaces. Particularly useful would be a single system which could provide total space air conditioning (both heating and cooling) using a source of low-grade thermal energy, since a large fraction of the power consumed today is for refrigeration or space cooling. One such system which can provide both heating and cooling in addition to energy conversion is disclosed in U.S. Pat. No. 3,943,719, issued Mar. 16, 1976. The described system produces high-pressure hydrogen by heating a metal hydride while retaining it at constant volume and generating power by expanding the compressed gas through a turbine or similar device. Thermal energy is recovered from the hot hydrogen gas before it is expanded, and refrigeration is supplied by using the expanded—and cold—hydrogen to absorb heat from a heat exchange fluid. However, the recovery of heat and refrigeration by this method is neither efficient nor effective for either space heating or cooling because it utilizes only the heat capacity of hydrogen gas.

SUMMARY OF THE INVENTION

We have invented an integrated system suitable for use with any thermal energy source including low-grade thermal energy sources, which provides thermal energy storage, space heating and cooling and power conversion and which operates in part on a chemical heat pump principle. The system, broadly described, consists of a plurality of reaction vessels, each containing a heat exchanger, a hydrogen gas outlet and a hydride or a hydridable material capable of forming a hydride by reaction with hydrogen at a low temperature and pressure and thermally decomposing at a higher temperature to release hydrogen, a first vessel containing a first hydride or hydridable material and a second vessel containing a second hydridable material, a source of thermal energy connected with the heat exchanger in the first vessel for selectively heating the first hydride to decomposition temperature, thereby releasing hydrogen, a conduit between the gas outlets in the first and second vessels for directing the flow of hydrogen between the vessels, waste heat transfer means connected to the heat exchanger of the second pressure vessel for selectively removing waste heat of reaction from the vessel during hydride formation and expelling the heat to the outside environment and for absorbing heat from the outside environment for supplying heat of decomposition to the vessel for hydride decomposition, space heat transfer means connected to the heat exchangers in both vessels for selectively removing the heat of reaction from the vessels during hydride formation and for supplying heat of decomposition to the vessels during hydride decomposition and heat recovery means connected to the space heat transfer means for recovering heat from the transfer means for space heating and for supplying heat to the transfer means for space cooling. For power conversion, at least two reaction vessels contain a second hydride having a relatively high decomposition pressure at the temperature available from the thermal energy source, the source of thermal energy is connected to the heat exchanger in both vessels for selectively heating the hydride to decomposition temperature, the waste heat transfer means is coupled to the heat exchanger in both vessels for selectively removing the heat of reaction, and the hydrogen conduit contains an expansion engine whereby high-pressure hydrogen released by the decomposition of the hydride in one vessel is expanded in the engine producing energy and the expanded gas is directed to the second vessel.

It may be noted that using the heat of reaction, as in the present invention, is at least an order of magnitude more effective than relying on the heat capacity of hydrogen gas for heating and cooling purposes.

As used herein, the word "hydride" or phrase "hydridable material" are interchangeable since the particular hydrogen-to-metal ratio of the material present in each vessel will depend upon the particular point in the hydride-dehydride cycle being described.

It is therefore the object of the invention to provide an integrated system for storing energy, for providing space heating and cooling and for generating power which can utilize thermal energy from any source including low-grade heat sources.

BRIEF DESCRIPTION OF THE DRAWING

The single FIGURE is a schematic flow diagram of the apparatus of the invention showing a solar energy collector as the source of low-grade thermal energy.

DETAILED DESCRIPTION OF THE INVENTION

Referring now to the drawing, the system of the invention as shown consists of four reaction vessels 12, 14, 16 and 18, each vessel containing a heat exchange loop 20, 22, 24 and 26 and a short gas conduit 28, 30, 32 and 34, respectively. The heat exchange loops may be either in or around the vessels. Vessels 12 and 14 contain a first hydride or hydridable material capable of reacting with hydrogen to form a hydride having a decomposition pressure of from about 8 to 12 atmospheres at 100° to 130° C. and 0.1 to 0.5 at 30° to 50° C., vessel 18 contains a second hydride having a decomposition pressure of about 20 to 50 atmospheres at 100° to 130° C. and 1-7 atmospheres at 10° to 50° C. and vessel 16 may contain either the first or second hydride. Thermal energy for hydride decomposition supplied by solar energy collector 36 is transferred to a heat transfer fluid in heating loop 38 and circulated by pump 40. The fluid, at 100° to 130° C., is supplied by inlet manifold 42 selectively through heat inlet conduits 44, 46 and 48, controlled by inlet valves 50, 52 and 54, through branch conduits 56, 58 and 60 to heat exchange loops 20, 22 and 24 in vessels 12-16, respectively. The fluid returns through branch return conduits 62, 64 and 66 and heat outlet conduits 68, 70 and 72 controlled by valves 74, 76 and 78 to heating loop return manifold 80.

Waste heat of reaction produced during hydride formation is removed from the vessels and heat of decomposition is supplied by a heat transfer fluid circulating in waste heat transfer loop 82 by pump 84. The fluid is at outside ambient temperature by passing through a heat exchanger 86 located in the outdoor environment and is supplied through inlet manifold 88 selectively through waste heat inlet conduits 87, 89, 90 and 92, controlled by inlet valves 91, 93, 94 and 96, through branch conduits 56, 58, 60 and 98 to exchange loops 20 to 26 in vessels 17 to 18, respectively. The fluid returns through branch return conduits 62, 64, 66 and 100 and return waste heat outlet conduits 99, 101, 102 and 104, controlled by valves 103, 105, 106 and 108, respectively, to branch return manifold 110.

Heating and refrigeration are supplied to the spaces to be air conditioned by a heat transfer fluid circulated by pump 112 in space heat transfer loop 114 and by heat exchanger 116 which may be physically located in the spaces to be air conditioned or connected with such spaces by some additional means of heat transfer such as air or water. The fluid in loop 114 is supplied through inlet manifold 118 selectively through inlet conduits 120, 122, 124 and 126, controlled by valves 128, 130, 132 and 134, respectively, to branch conduits 56, 58, 60 and 98 to the heat exchange loops 20 to 26 in vessels 12 to 18, respectively, where the fluid is either heated by absorbing exothermically generated heat of reaction or is cooled for refrigeration and space cooling by giving up endothermic heat of decomposition. The fluid is returned through branch return conduits 62, 64, 66 and 100 to space heat return conduits 136, 138, 140 and 142, controlled by valves 144, 146, 148 and 150, to outlet manifold 152.

The flow of hydrogen gas is selectively directed between the reaction vessels by hydrogen loop 154, having an inlet manifold 156 connected to one end of short gas inlet conduits 158, 160 and 162, controlled by valves 164, 166 and 168 which are further connected to short gas conduits 28, 30 and 32 of vessels 12, 14 and 16, respectively. Gas return conduits 170, 172 and 174 also connect at one end to conduits 28, 30 and 32 and at the other end to outlet manifold 176 and are each controlled by valves 178, 180 and 182, respectively. Short gas conduit 34 contains control valve 184 and connects directly to outlet manifold 176 which also contains an expansion engine 186 to complete the apparatus.

The choice of hydrides which may be used with the apparatus of the invention will depend primarily upon the temperature which is available from the source of thermal energy, to decompose the first hydrides. Thus, for space heating and cooling purposes, the first hyrdide must be capable of decomposing at the temperature available from the source of thermal energy with sufficient pressure to react with the second hydridable material exothermically to produce a temperature adequate for space heating purposes, and whose hydrogen decomposition pressure at the space heating temperature is lower than the decomposition pressure of the second hydride at the low temperature available from the outside ambient environment for providing the heat of decomposition. For example, temperatures available from present solar energy collectors can range from about 100° to 150° C., while higher temperatures may be available from other sources. An exothermic reaction temperature of from 40° to 60° C. is sufficient for space heating purposes while about 0° C. outside ambient temperature is generally available for supplying heat of decomposition and which will also determine the refrigeration temperature available for space cooling.

The combination of $CaNi_5H_4$ as the first hydride with $LaNi_5H_6$ as the second hydride has been found successful, as has the use of $CaNi_5H_4$ as the first hydride with (cerium free) $MmNi_5H_6$ where (cerium free) Mm is mischmetal, a mixture of rare earth metals having the approximate composition La 77%, Nd 16%, Pr 5%, other lanthanide metals 2%. For example, $CaNi_5H_4$ decomposes at 130° C. with 12 atmospheres pressure while the hydrogen combines with $LaNi_5$ at 50° C. and 7 atmospheres. The $LaNi_5H_6$ will then decompose at 10° C. at 1 atmosphere, while the hydrogen reforms $CaNi_5H_4$ 50° C. and 0.5 atmosphere.

For power conversion, a hydride which decomposes at the available decomposition temperature with a relatively high pressure is preferred, such as $LaNi_5H_6$, which decomposes at 140° C. at 50 atmospheres and recombines at 35° C. at 4.9 atmospheres.

The energy conversion device may be any sort of mechanical device which can convert or use the internal energy from pressurized hydrogen gas to perform mechanical energy by expansion, such as a turbine or piston engine.

The following examples of thermal energy storage, space heating and cooling and power conversion are given using $CaNi_5H_4$ as the first hydride and $LaNi_5H_6$ as the second hydride. $LaNi_5H_6$ is used for the power conversion.

Thermal energy is stored in the system by opening inlet valves 50 and 52 and outlet valves 74 and 76. Solar energy impinging on solar collector 36 is absorbed by the heat transfer fluid in loop 38, heated to 100° to 130° C. and cirlated via heat inlet conduits 44 and 46 and branch conduits 56 and 58 to heat exchange loops 20 and 22 in vessels 12 and 14, respectively, each containing the first hydride. The heat exchange fluid returns via branch return conduits 62 and 64 and heat outlet conduits 68 and 70 to the return manifold 80 to complete the heating loop. As the hydride is heated, it decomposes, releases hydrogen gas at about 12 atmospheres pressure which is then transferred via hydrogen loop 154 to the second hydridable metals in vessels 16 and 18. This may be accomplished by opening valves 164 and 168 and directing the hydrogen from vessel 12 through short gas conduit 28, gas inlet conduit 158 and inlet manifold 156 to gas inlet conduit 162 and short gas conduit 32 to vessel 16, while by opening valves 18 and 184, gas from vessel 14 may be directed via conduits 30 and 172 and outlet manifold 176 to conduit 34 and vessel 18 to combine with the hydridable metal, forming the second hydride. As the hydride is formed, heat of reaction of about 50° C. is produced and must be removed for the reaction to go to completion. If recovery of the heat from the exothermic reaction is desirable for space heating purposes, inlet valves 132 and 134 and outlet valves 148 and 150 are all opened. Heat exchange fluid circulating in the inlet manifold 118 of space heat transfer loop thus flows through inlet conduits 124 and 126, through branch conduits 60 and 98 to heat exchange loops 24 and 26 in vessels 16 and 18 where the heat of reaction is absorbed by the fluid, returning via branch return conduits 66 and 18 and space heat return conduits 140 and 142 to space heat transfer loop 114. The heat is recovered from the fluid as it passes through indoor heat exchanger 116 located so that the heat recovered therefrom is usable for space heating.

If the heat of reaction from vessels 16 and 18 is not required for space heating, it must be exhausted to the outside ambient environment by opening inlet valves 94 and 96 and outlet valves 106 and 108 and passing the heat exchange fluid circulating in waste heat loop from inlet manifold 88 through waste heat inlet conduits 90 and 92 to branch conduits 60 and 98 to heat exchangers 24 and 26 in vessels 16 and 18 where it absorbs the heat of the reaction from the hydride bed returning via branch return conduits 66 and 100 to waste heat return conduits 102 and 104 into the branch return manifold 110 to outdoor heat exchanger 86 where the excess heat can be exhausted to the outside ambient environment.

In order to recover the thermal energy now stored as chemical bond energy in the second hydride in vessels 16 and 18, heat of decomposition can be supplied from the ambient environment at a low temperature. For example, a decomposition pressure of 1 atmosphere is achieved at 10° C. This heat is supplied to the vessels by the waste heat loop 82 using heat absorbed by the heat transfer fluid from the outside ambient atmosphere via outside heat exchanger 86. It may be noted that the heat transfer fluid follows the same path in both the heat rejection and thermal energy recovery modes.

As the hydrides in vessels 16 and 18 are decomposed to a hydridable metal and hydrogen, the flow of the gas is directed via the various gas inlet and outlet conduits and hydrogen loop 154 to the first hydridable metal in vessels 12 and 14 where it recombines with the metal to form the hydride giving up the heat of reaction at 50° C. This heat is recovered from the vessels by opening inlet valves 128 and 130, outlet valves 144 and 146, and circulating the heat exchange fluid in the heat transfer loop through conduits 120 and 122 and branch conduits 56 and 58 to heat exchange loops 20 and 22, the fluid returning through branch return conduits 62 and 64 and space heat return conduits 136 and 138 to return manifold which directs the fluid to space heat exchanger 116. Here the heat is removed from the circulating fluid and recovered for space heating.

For space cooling purposes, thermal energy is first stored in the form of chemical bond energy in vessels 16 and 18 as hereinbefore described for space heating, the heat of reaction in vessels 16 and 18 being removed and exhausted to the outside ambient temperature via heat exchanger 86, also as previously described. Refrigeration is provided for space cooling by decomposing the hydrides in vessels 16 and 18 with heat provided by space heat transfer loop 114 since the second hydride will decompose at about 1 atmosphere at about 10° C. As the heat is absorbed by the endothermic reaction, the fluid in the loop cools to 10° C. which, as it circulates to the inside heat exchanger 116, can be used as refrigeration to provide for space cooling. The hydrogen gas liberated by the decomposition of the hydrides is directed to the hydridable metals in vessels 12 and 14 where it recombines with the hydridable metals at about 35° C. to reform the hydride. The heat of reaction is removed by vessels 12 and 14 by circulating the heat transfer fluid from the waste heat transfer loop through the vessels, the heat being exhausted to the outside ambient environment through outside heat exchanger 86.

As hereinbefore described, the transfer of heat and hydrogen has taken place simultaneously between vessels 12 and 14 and vessels 16 and 18. It is obvious that it may be desirable to operate the vessels sequentially, i.e. to be transferring hydrogen from vessel 12 to vessel 16 for energy storage while at the same time hydrogen is being transferred from vessel 18 to vessel 14 for either space heating or for space cooling. This is the preferred method of operation since it provides a means of continuous cooling.

In the energy conversion mode of operation, the second hydride is used to provide a source of high-pressure hydrogen available for mechanical work. In this mode, vessels 12, 14 and 16 contain either the second hydride or the second hydridable metal, depending upon the position in the power conversion cycle. The fourth vessel may or may not be used. However, if it is used, it will contain the same hydride as the first three vessels. In operation, heat from the thermal energy source at about 130° C. is directed via the heating loop by opening the appropriate valves to the first vessel, decomposing the hydride to a hydridable metal and hydrogen gas at a pressure of about 50 atmospheres. By opening valve 178 the high-pressure hydrogen is directed via short gas conduit 28 and gas return conduit 170 and inlet manifold 176 of hydrogen gas loop 154 to the expansion engine where the internal energy of gas performs mechanical work by expansion. The spent hydrogen is then passed through inlet manifold 156 and inlet conduit 160 and short gas conduit 30 to vessel 14 where the hydride combines with the hydridable metal to form the hydride. The heat of reaction is removed by opening inlet valve 91 and outlet valve 103 and circulating the heat transfer fluid in waste heat loop 82 through the vessel where the heat is absorbed by the fluid and carried to the outside heat exchanger 86 where it is given up to the outside ambient environment. Simultaneously vessel 16 which contains a metal hydride is also being cooled by fluid circulating in the waste heat loop in preparation for the next phase. Once all of the hydrogen has been driven from the hydride in vessel 12, the fluid in the heating loop is circulated to heat exchange loop 22 in vessel 14 where the hydride just formed is heated to decomposition temperature, decomposing the hydride to hydrogen which is directed by opening valve 180 via gas conduit 30 and gas return conduit 172 to outlet manifold 176 through the expansion engine 186, the spent gas being directed through manifold 156 to the now cooled vessel 16. Vessels 16 and 12 are now both being cooled by fluid circulating from the waste heat loop, the fluid in vessel 16 removing the heat of reaction of the formation of the hydride and the fluid in vessel 12 cooling the hydridable material in preparation for the next step. Once all of the hydride has been decomposed, the heat input from the heat transfer loop is directed to vessel 16, the hydrogen going through the expansion engine 186 to vessel 12 while vessels 12 and 14 are both being cooled by waste heat loop 82. Continuance of this sequence will provide a continuous input of high-pressure hydrogen gas to the expansion engine. Any number of vessels containing a hydridable metal could be used in the above-described power-producing sequence, but the minimum number of vessels is three.

It is possible to both generate electricity and space heating at the same time by using space heat loop 114 to remove the heat of reaction from the hydride-forming vessel rather than the waste heat loop at a loss in power conversion efficiency.

While the system as shown and described uses four vessels containing hydrides or hydridable metals, it is obvious that the system could include any number of vessels. For example, the system could include two vessels containing a first hydride and two vessels containing a second hydride to be used for space heating and cooling as necessary and at least three more vessels containing the second hydride to be used only for power-producing purposes, all using the same loops and thermal energy source.

The embodiments of the invention in which an exclusive property or privilege is claimed are defined as follows:

1. A method of space cooling comprising:
    heating a first body of a first hydride having a decomposition pressure of from about 8 to 12 atmospheres at 100° to 130° C. and 0.1 to 0.5 atmospheres at 30° to 50° C. to a temperature of 100° to 130° C. hereby the hydride decomposes to a first hydridable material and hydrogen,
    absorbing the hydrogen on a first body of hydridable material to form a second hydride having a decomposition pressure of about 20 to 50 atmosphere at 100° to 130° C. and 1 to 7 atmospheres at 10° to 50° C. while maintaining the bed at a temperature below the decomposition temperature of said second hydride at the pressure obtaining by rejecting the heat to the outside ambient,
    simultaneously space cooling by utilizing the ambient heat of the space to be cooled to heat a second body of said second hydride to decomposition temperature whereby the hydride decomposes to a second hydridable material and hydrogen,
    absorbing the hydrogen on a second body of hydridable material to form said first hydride by maintaining the bed at a temperature below the decomposition temperature of said first hydride at the pressure obtaining by rejecting the heat to the outside ambient, and
    sequentially continuing the cycle to obtain continuous space cooling.

2. The method of claim 1 wherein the first hydride is $CaNi_5H_4$ and the second hydride is either $LaNi_5H_6$ or $MnNi_5H_6$ where Mn is cerium free mischmetal.

3. A method of space heating comprising:
    heating a first body of a first hydride having a decomposition pressure of from about 8 to 12 atmospheres at 100° to 130° C. and 0.1 to 0.5 atmospheres at 30° to 50° C. to a temperature of 100° to 130° C. whereby the hydride decomposes to a first hydridable material and hydrogen,
    absorbing the hydrogen on a first body of hydridable material to form a second hydride having a decomposition pressure of about 20 to 50 atmospheres at 100° to 130° C. and 1 to 7 atmospheres at 10° to 50° C. by maintaining the bed at a temperature below the decomposition temperature of said second hydride at the pressure obtaining and utilizing the heat for space heating,
    simultaneously heating a second body of said second hydride to 0° to 10° C. utilizing heat from the outside ambient whereby the hydride decomposes to a second hydridable material and hydrogen,
    absorbing the hydrogen on a second body of hydridable material to form said first hydride by maintaining the bed at a temperature below the decomposition temperature of said first hydride at the pressure obtaining and utilizing the heat for space heating, and
    sequentially continuing the cycle to obtain continuous space heating.

4. The method of claim 3 wherein the first hydride is $CaNi_5H_4$ and the second hydride is either $LaNi_5H_6$ or $MnNi_5H_6$ where Mn is cerium free mischmetal.

5. An apparatus for providing space heating and cooling comprising:
    a pair of first bodies,
    a first hydride-hydridable material in one of said bodies, said material having a decomposition pressure of from about 8 to 12 atmospheres at 100° to 130° C. and 0.1 to 0.5 atmosphere at 30° to 50° C.,
    a second hydride-hydridable material in the other of said bodies, said material having a decomposition pressure of from about 20 to 50 atmospheres at 100° to 130° C. and 1 to 7 atmospheres at 10° to 50° C.,
    means for supplying heat to the first body containing the first hydride-hydridable material for decomposing the hydride-hydridable material, releasing hydrogen,
    means for transferring the hydrogen between the first two bodies,
    an indoor heat exchanger,
    a first loop containing a heat exchange fluid coupling the indoor heat exchanger to the pair of first bodies alternatively for removing the heat of reaction from the hydride-hydridable material in the bodies and transforming the heat to the indoor heat exchanger for space heating and for supplying heat for decomposition of the second hydride-hydridable material from the indoor heat exchanger when the system is used for space cooling, an outdoor heat exchanger, and a second loop containing a heat exchanger fluid coupling the outdoor heat exchanger to the pair of first bodies alternatively for removing the heat of reaction of both hydride-hyridable materials in the bodies to the outdoor heat exchanger when the system is used for space cooling and for supplying heat for decomposition of the second hydridehydridable material from the outdoor heat exchanger when the system is used for space heating.

6. The hydrogen-hydride system of claim 5 wherein the system contains a pair of second bodies coupled to the first and second heat exchange loops, one of the second bodies containing the first hydride-dehydride material, the other second body containing the second hydride material, the second bodies including means for transferring hydrogen between the bodies, and means for heating the first hydride-hydridable material.

7. The system of claim 6 wherein the first hydride-hydridable material is $CaNi_5H_6$ and the second hydride-hydridable material is either $LaNi_5H_6$ or $MnNi_5H_6$ where Mn is cerium-free mischmetal.

* * * * *